March 13, 1962 — H. NYMAN — 3,024,732
REGULATING VALVE
Filed Feb. 1, 1957 — 3 Sheets-Sheet 1

INVENTOR.
HUGO NYMAN
BY Lyon & Lyon
ATTORNEYS

March 13, 1962

H. NYMAN 3,024,732

REGULATING VALVE

Filed Feb. 1, 1957

INVENTOR.
HUGO NYMAN
BY Lyon+Lyon
ATTORNEYS

United States Patent Office 3,024,732
Patented Mar. 13, 1962

3,024,732
REGULATING VALVE
Hugo Nyman, Whittier, Calif., assignor to Sargent Engineering Corporation, Huntington Park, Calif., a corporation of California
Filed Feb. 1, 1957, Ser. No. 637,765
15 Claims. (Cl. 103—42)

This invention relates generally to valves of the type used in hydraulic systems and more particularly to an adjustable pressure regulated valve used in combination with an unloading valve.

Unloading valves are used in hydraulic systems to control pressure to permit continuous operation of the system pump or other fluid impelling device. Conventionally, such valves are positioned and adjusted so as to change the direction of flow of fluid in the system at a predetermined maximum system pressure and to redirect the flow when the pressure drops to or below a predetermined minimum. Generally such valves do not accurately respond to pressure changes, are subject to pressure "hammering" and are difficult to regulate. Further, the range of response, i.e., the difference between the maximum and minimum pressures necessary to change the valve position is relatively wide and difficult to control.

Accordingly, one of the principal objects of the present invention is to provide a regulating valve by which the operation of an unloading valve may be accurately controlled.

A further object of the present invention is to provide such a regulating valve by which the range of response of the unloading valve may be adjustably controlled.

A further object of the present invention is to provide a regulating valve structure having at least two valve members which may be independently adjusted to control the range of response of the unloading valve.

A more particular object of the present invention is to provide such a valve structure in which at least one of the valves operates by a snap action.

Other objects and advantages of this invention, it is believed, will be readily apparent from the following detailed description of a preferred embodiment thereof when read in connection with the accompanying drawings in which:

FIGURE 5 is a sectional elevation taken substantially on the line 5—5 of FIGURE 3.

FIGURE 6 is a sectional plan view taken substantially in the line 6—6 of FIGURE 5.

Figure 1:
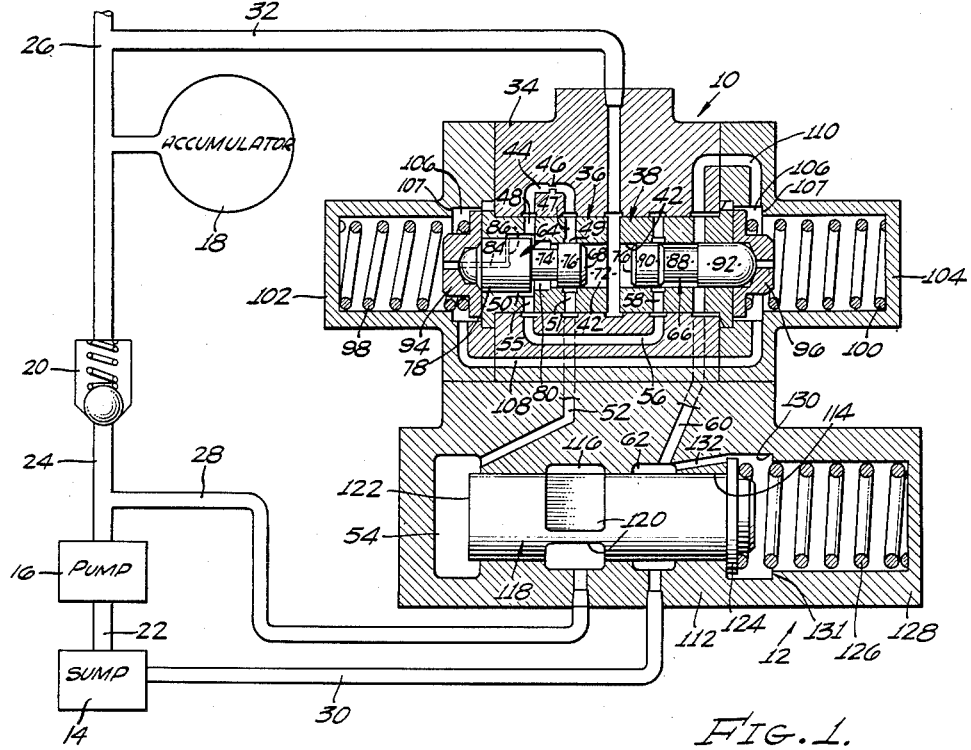
FIGURE 1 is a schematic diagram showing the valve incorporated in a hydraulic system in which the pressure is at a minimum.

Referring to FIGURE 1, there is shown a system including the regulating valve 10, an unloading valve 12, a fluid sump or reservoir 14, a pump 16, an accumulator 18 and a check valve 20. The pump 16 is adapted to pump fluid from the reservoir 14 through a conduit 22 and deliver it through a pump output conduit 24, the check valve 20, and a pressure conduit 26 to a fluid consuming system (not shown). The accumulator 18 which is floated on the pressure conduit 26 is employed to equalize pressure variations in the pressure conduit and to maintain the pressure in the conduit while the pump 16 is not supplying demand.

Figure 2:
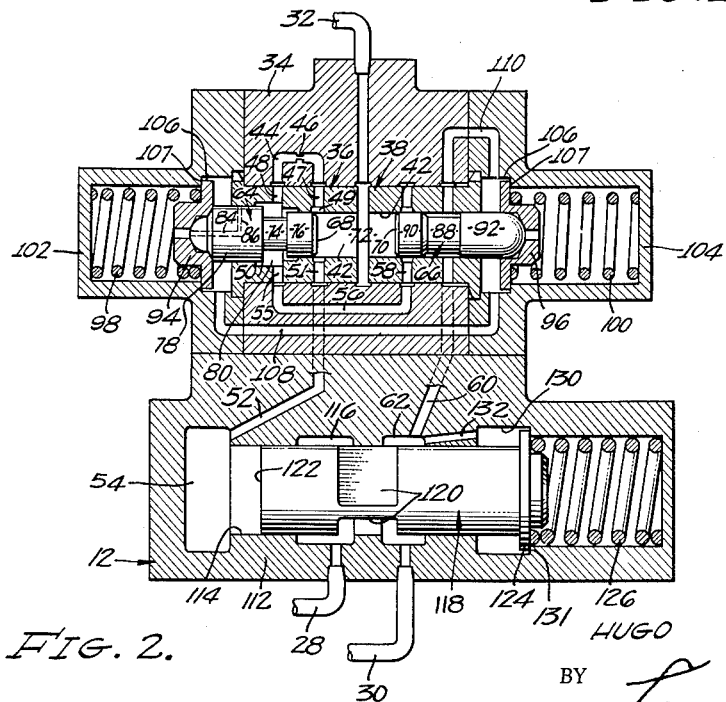
FIGURE 2 is a schematic diagram showing the valve at the maximum system pressure.
Figure 3:
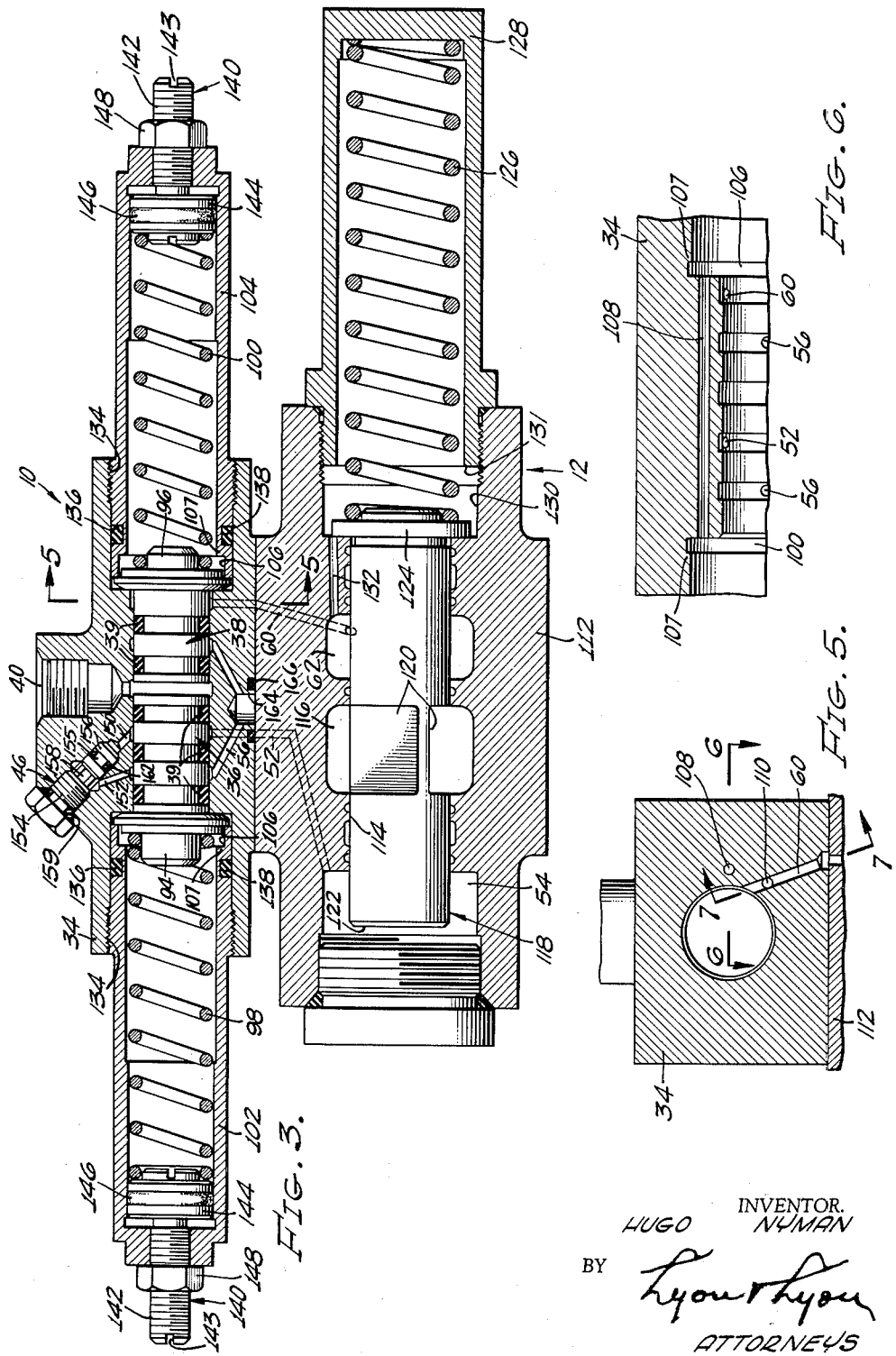
FIGURE 3 is a sectional view of the regulating valve and pilot valve.

The unloading valve 12 is joined to the pump output conduit 24 by a bypass conduit 28 and to the reservoir by an exhaust conduit 30. While the unloading valve 12 is closed as shown in FIGURE 1, the pump delivers fluid to the fluid consuming system. When the unloading valve is opened as shown in FIGURE 2, the pump delivers fluid through the unloading valve to the reservoir 14.

The function of the regulating valve 10, in accordance with the present invention, is to control the opening and closing of the unloading valve 12 and thereby the pressure in the pressure conduit 26. Generally, this is accomplished by pressure activation of the regulating valve 10 which permits fluid from the pressure conduit 26 through a control conduit 32 to open the unloading valve 12 at a predetedmined maximum pressure and which causes the unloading valve to close at a predetermined minimum pressure.

The regulating valve consists of a casing 34 enclosing a pair of shouldered sleeves 36 and 38, the shouldered ends of which abut against the casing 34. The surfaces of the sleeves are provided with a plurality of O ring containing grooves 39 to prevent fluid leakage. An inlet port 40 connected to the control conduit 32 passes through the casing 34 and intersects the bore 42 formed by the joined sleeves 36 and 38. To one side of the port 40, there is a bleed passage 44 positioned to permit fluid to flow from the bore 42 through constriction means 46 and back to the bore 42. The bleed passage 44 has a bore outlet opening 47 which is closer to the port 40 than a bore inlet opening 48.

At the outlet and inlet openings, the bore 42 is provided with annular grooves 49 and 50. Intersecting the annular groove 49 is a radial port 51 connected to an unloading valve passage 52 (hereinafter sometimes referred to as first outlet passage), which permits fluid to flow from the bore 42 to a pressure cavity 54 in the unloading valve 12. Intersecting the annular groove 50 is a radial port 55 connected to a bleed passage 56 which passes through the casing 34 and is connected to a radial port 58 in the sleeve 38. The radial port 58 is located on the other side of the port 40 from the passage 44 and at a point equal to the distance from the port 40 to the bore outlet opening 47 of the passage 44.

The sleeve 38 is provided with an exhaust passage 60 (hereinafter sometimes referred to as second outlet passage), which communicates with an annular groove 62 in the unloading valve 12 which is connected to the exhaust conduit 30.

Within the bore 42 are a pair of oppositely disposed valve spools 64 and 66 cooperating with the sleeves 36 and 38 to form a pair of pressure responsive valves (the valve formed by the cooperation of the spool 66 and sleeve 38 will hereinafter sometimes be referred to as "first pressure responsive valve"; the valve spool 64 cooperating with the sleeve 36 will hereinafter sometimes be referred to as "second pressure responsive valve"). The confronting pressure surfaces 68 and 70 of the spools define a primary pressure chamber 72 which communicates with the inlet port 40. The spool 64 is grooved to form a neck portion 74 between a head portion 76 and a seated portion 78. Between the neck portion 74 and the wall of the bore 42 is a secondary pressure chamber 80. The cross-sectional area of the seated portion 78 is greater than the cross-sectional area of the head portion 76. The sleeve 36 has a counterbore 81 extending from its shouldered end to the bore inlet opening 48 and the radial port 55 to accommodate the seated portion. The area of the pressure surface 82 of the seated portion 78 is larger than the area between the neck portion 74 and the head portion 76 which is subject to pressure. Free forward movement of the spool 64 into the pressure chamber 72 is prevented by the butting of the peripheral edges of the pressure surface 82 against the shoulders 83 of the counterbore 81.

The seated portion 78 is provided with a central bore 84 which is connected to a bleed passage 86. The bleed passage 86 communicates with the annular groove 50 which extends from the bore inlet opening 48 of the bleed passage 44 to the opening of the bleed passage 86 in the seated portion 78.

The spool 66 is also grooved to form a neck portion 88 between a head portion 90 and a seated portion 92. The end of the seated portion is provided with a pin 93 which extends on either side of the circumferential surface of the spool 66 and prevents this spool from moving freely into the pressure chamber 72. The valve spools 64 and 66 are seated in spring retainers 94 and 96 which are formed to receive the ends of the seated portions 78 and 92 of the respective spools. The spring retainers 94 and 96 and thus the respective spools 64 and 66 are urged toward each other by springs 98 and 100 which are contained in their respective spring housings 102 and 104. The housings 102 and 104 are provided with counterbores 106 into which the spring retainers 94 and 96 fit. The retainers are thus urged forward against the sleeves 36 and 38 and the casing 34 by the force of the springs 98 and 100 and are prevented from traveling back into the respective housings in response to fluid pressure in the pressure chamber 72 by the housing shoulders 107 at end of counterbores 106.

Figure 4:
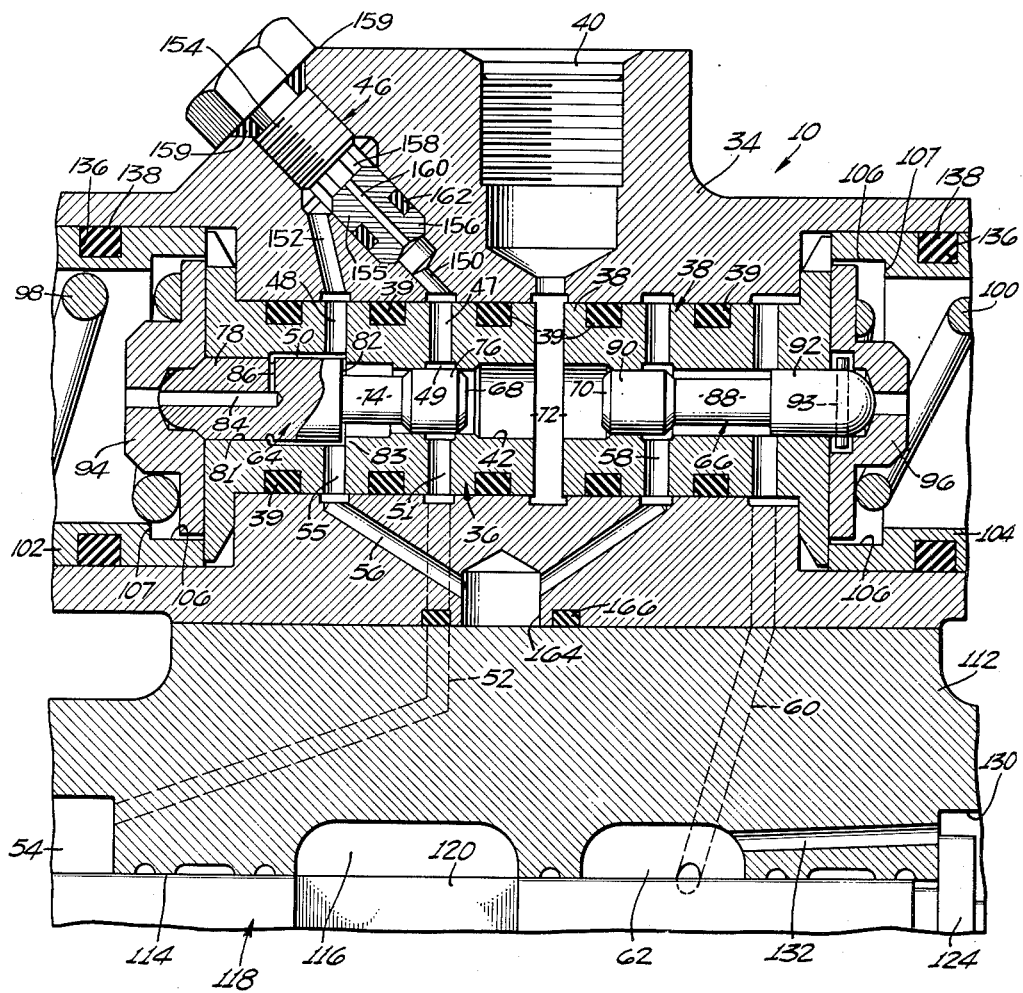
FIGURE 4 is an enlarged sectional view of the regulating valve.
Figure 7:
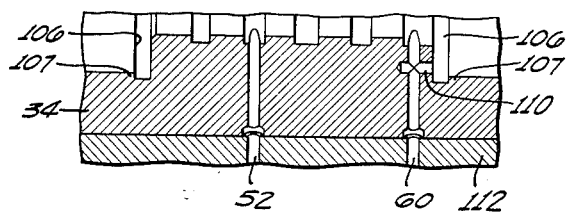
FIGURE 7 is a sectional view taken substantially on the line 7—7 of FIGURE 5.

A bleed passage 108 is positioned to permit fluid to flow from the housing 102 to the housing 104. An overflow passage 110 connects the housing 104 with the exhaust passage 60. By this construction, fluid is allowed to flow from the secondary pressure chamber 80 through the bleeds passage 86, the bore 84, the housings 102 and 104 and the overflow passage 110 into the exhaust port 60 and thence to the reservoir 14 when the spool 64 is in its forward or normal position as shown in FIGURES 1 and 4. The secondary pressure chamber is cut off from this flow pattern when the spool 64 is in its back or pressure position as shown in FIGURE 2.

The unloading valve 12 is joined to the regulating valve 10 by any suitable means and consists of a casing 112 which is provided with the aforementioned passages 52 and 60. The unloading valve is provided with a bore 114, the pressure cavity 54 and annular grooves 116 and 62. The annular groove 116 is connected to the bypass conduit 28. Into the bore 114 is inserted a movable valve element or plunger 118 which is provided with a plurality of flats 120. The pressure surface 122 of the plunger 118 faces into the pressure cavity 54 while the other end of the plunger is fitted into a spring retainer disk 124. The disk 124 and thus the plunger 118 is urged toward the pressure cavity 54 by a spring 126 which is contained in a spring housing 128. The spring housing 128 is provided with a counterbore 130 the shoulder 131 of which limits the spring compressive travel of the retainer disk 124 and the plunger 118. A bleed passage 132 connects the spring housing 128 and the annular groove 62.

The spool 64 is positioned in the bore 42 so that in its normal or forward position as shown in FIGURES 1 and 4 the bore-contacting cylindrical surface of the head portion 76 closes the bore outlet opening 47 of the bleed passage 44 and the radial port 51. The annular groove 49 provides a flow path for fluid when the spool 64 is in this normal position. When the spool 64 is in its back or pressure position as shown in FIGURE 2, fluid may pass through the bleed passage 44 from the pressure chamber 72 into the secondary pressure chamber 80 and through the unloading valve passage 52 into the pressure cavity 54.

The spool 66 is positioned in the bore so that in its normal or forward position the head portion 90 is forward of the radial port 58 and the seated portion 92 is back of the exhaust passage 60. When the spool 66 is in its back or pressure position the bore contacting cylindrical surface of the head portion 90 closes the radial port 58.

When the plunger 118 is in its forward or normal position, the flats 120 lie within the cylindrical area defined by the annular groove 116. When the plunger 118 is in its back or pressure position the flats 120 span the lands between the annular grooves 116 and 62 providing a fluid flow path from the pump outlet conduit 24 through the bypass conduit 28 and the exhaust conduit 30 to the reservoir 14.

More specific structure is shown in FIGURES 3 through 7. The casing 34 is provided with threaded openings 134 into which the spring housings 102 and 104 may be secured. The inserted portion of the respective housings are provided with grooves 136 which carry suitable O rings 138 to prohibit fluid leakage. Each housing 102 and 104 is provided with spring adjustment means 140 which consist of a threaded bolt 142 having a screw slot 143 at one end, and a grooved head 144 at the other. An O ring 146 is carried by the head 144 to inhibit passage of fluid. The respective heads 144 are formed to receive the springs 98 and 100. A nut 148 is threaded onto the bolt 142 so as to contact the spring housing. By turning the bolt 142, the head 144 may force the respective springs 98 and 100 to compress or expand thereby increasing or decreasing the pressure on the spring retainers 94 and 96 and thus varying the amount of pressure necessary to move the spools 64 and 66.

The constriction means 46 which is inserted into the casing 34 through a suitable opening divides the bleed passage 44 into two channels, a bore outlet channel 150 and a bore inlet channel 152. The constriction means 46 consists of a threaded bolt 154 which positions a constricting element 155 having a leading section 156 and a drain section 158. The bolt 154 is provided with an O ring containing groove 159 which inhibits fluid flow between the bolt 154 and the casing 34. The leading section 156 is provided with a central bore 160 and a peripheral O ring containing groove 162. The bore 160, which communicates with the bore outlet channel 150 and the drain section 158, has a substantially smaller cross-sectional area than either of the channels 150 or 152. The bore inlet channel 152 communicates with the drain section 158 and by this construction, fluid may be permitted to pass from the pressure chamber 72 through the constriction means 46 into the secondary pressure chamber 80 with a resulting drop in fluid pressure across the constriction means.

In constructing the bleed passage 56, for ease of manufacture, a cup 164 is drilled into the casing 34 to provide an opening through which the channel arms may be drilled. Encircling this cup 164 is an O ring containing groove 166 which prevents fluid flow between the regulating valve casing 34 and the unloading valve casing 112.

In the operation of the system thus described, the pump 16 delivers fluid to the fluid consuming system. While the pressure in the system remains below a predetermined maximum, the unloading valve 12 remains closed preventing fluid from passing through this valve to the reservoir 14. As the pressure in the system increases from a predetermined minimum, the valve spool 66, in response to fluid pressure in the pressure chamber 72 transmitted to it through the control conduit 32, is urged toward its back or pressure position closing off the radial port 58 of the bleed passage 56. Further movement of the spool 66 is prevented by the shoulders 107 of the housing 104. As the pressure continues to increase, the valve spool 64 is urged toward its back or pressure position. The first movement of the spool 64 cuts off the connection between the bleed passage 86 and the annular groove 50. At a predetermined intermediate system pressure, the spool 64 has moved far enough to expose the annular groove 49 to the pressure chamber 72. Fluid is then permitted to flow into the bore outlet channel 150 of the bleed passage 44 through the constriction means 46 and the bore inlet channel 152 into the secondary pressure chamber 80. The movement of the spool 64 also permits fluid to flow through the unloading valve passage 52 into the pressure cavity 54. Since the volume of the secondary pressure chamber 80 is appreciably smaller than the volume of the cavity 54, pressure build up in the secondary pressure chamber is considerably more rapid than in the cavity 54.

At a predetermined maximum pressure, the pressure in the secondary pressure chamber 80 acts on the pressure surface 82 to suddenly increase the rate of movement of the spool 64 toward its pressure position until the spring retainer 94 contacts the shoulder 107 of the spring housing 102, thereby fully opening the unloading valve passage to the pressure chamber 72. The pressure in the pressure cavity 54 is thus suddenly increased, driving the plunger 118 to its back or pressure position forming an opening between the annular grooves 62 and 116 past the flats 120. The opening of the unloading valve 12 causes the pump to force fluid through the unloading valve to the reservoir 14 rather than to the fluid consuming system causing the pressure in the fluid consuming system to start to drop.

As the pressure in this system and thereby in the pressure chamber 72 drops, the spool 64 is held in its back or pressure position by the combined pressure in the primary pressure chamber 72 and the secondary pressure chamber 80. Since the spool 64 is subject to pressure over a considerably greater area than the spool 66, further decrease in pressure permits the spool 66 to return to its forward or normal position at a pressure higher than that required to return the spool 64. Thus, at a predetermined minimum pressuer the spool 66 slides forward uncovering the radial port 58. The uncovering of the radial port 58 permits fluid to flow from the secondary pressure chamber 80 through the bleed passage 56 into the reservoir 14 by way of a path around the neck portion 88, passage 60, groove 62, and conduit 30. The flow of fluid out of the secondary passage chamber 80 is more rapid than the flow of fluid into it from the primary pressure chamber 72 because of the constriction in the bleed passage 44, thereby reducing the pressure in the secondary pressure chamber 80, permitting the spool 64 to slide forward, cutting off the unloading valve passage 52 to the primary pressure chamber 72. Since the pressure cavity 54 is no longer subject to pressure, fluid from the pressure cavity 54 is free to flow back through the unloading valve passage 52 into the annular groove 49, around the spool 64 and through the bleed passage 44 into the secondary pressure chamber 80, through the bleed pasasge 56 and then past the neck portion 88 of the spool 66 into the annular groove 62 through the exhaust passage 60 and thence to the reservoir 14. The return of the spool 64, therefore, causes an immediate drop in pressure in the pressure cavity 54, permitting the unloading valve 12 to close. When this valve has closed the pump 16 then delivers fluid to the pressure consuming system.

Fluid which leaks past the head portion 76 of the spool 64 is free to pass through the annular groove 50, the bleed passage 86 and the central bore 84 into the spring housing 102. Since the spring housing 102 is connected to the spring housing 104 by a bleed passage 108 and the spring housing 104 is connected to the exhaust passage 60 by an overflow passage 110, fluid accumulation in the respective housings and in the secondary pressure chamber 80 is prevented.

It will be apparent that by suitable adjustment of the springs 98 and 100 controlling the spools 64 and 66 the pressures required to open and close the unloading valve 12 can be accurately and consistently controlled. Since either of these spools may be adjusted to respond to any predetermined pressure the pressure range needed to actuate the respective spools may be very small.

Having fully described my invention, it is to be understood that I do not wish to be limited to the details set forth, but my invention is of the full scope of the appended claims.

I claim:

1. In a pressure regulating device having an unloading valve assembly including a spring loaded pressure responsive movable valve element for controlling flow from a bypass conduit to an exhaust conduit and means defining a cavity, the element having a pressure face exposed to pressure in the cavity, the improvement comprising, in combination: a regulating valve assembly having a primary pressure chamber, means including a first pressure responsive valve for selectively connecting said cavity to said exhaust conduit, means including a second pressure responsive valve for selectively connecting the cavity to the primary pressure chamber, each of said pressure responsive valves having a pressure surface exposed to pressure in said primary pressure chamber, means urging each said pressure surface toward said primary pressure chamber and yieldably responsive to different values of pressure in said primary pressure chamber acting on said first and second pressure responsive valves to permit relative movement of said pressure surfaces, the pressure required to actuate the second valve being greater than that required to actuate the first valve.

2. In a pressure regulating device having an unloading valve assembly including a spring loaded pressure responsive movable valve element for controlling flow from a bypass conduit to an exhaust conduit and means defining a cavity, the element having a pressure face exposed to pressure in the cavity, the improvement comprising, in combination: a regulating valve assembly having a fluid supply passage and a primary pressure chamber communicating with said fluid supply passage, means including a first pressure responsive valve for selectively connecting said cavity to said exhaust conduit, means including a second pressure responsive valve for selectively connecting the cavity to the primary pressure chamber, the first and second valves each having a movable spool provided with a face subjected to pressure in the primary pressure chamber, means urging each of said spools toward said primary pressure chamber and yieldably responsive to different values of pressure in said primary pressure chamber acting on said first and second pressure responsive valves to permit relative movement of said spools, the pressure required to actuate the second valve being greater than that required to actuate the first valve, and means including a restricted bypass communicating with said primary pressure chamber and responsive to initial movement of the second valve spool for shifting the same with a snap action to pressure position.

3. In a pressure regulating device having an unloading valve assembly, including a spring loaded pressure responsive movable valve element for controlling flow from a bypass conduit to an exhaust conduit and means defining a cavity, the element having a pressure face exposed to pressure in the cavity, the improvement comprising, in combination: a regulating valve assembly having a primary pressure chamber, an unloading valve passage operatively connecting said primary pressure chamber with said cavity, an exhaust passage communicating with said exhaust conduit, a bleed passage operatively connecting said unloading valve passage and said exhaust passage, a first pressure responsive valve for controlling flow to said exhaust passage from said bleed passage, a second pressure responsive valve for controlling flow to said unloading valve passage from said primary chamber, each of said pressure responsive valves having a primary pressure surface exposed to pressure in said primary pressure chamber, biasing means urging each of the said primary pressure surfaces toward said primary pressure chamber, said second valve having a secondary pressure chamber with a secondary pressure responsive surface exposed to pressure in said secondary pressure chamber, said second valve having means including a restricted bypass for selectively connecting the primary and secondary pressure chambers upon relative movement of its primary pressure surface, said first and second valves being responsive to pressure in said primary pressure chamber acting on said primary pressure surfaces whereby increasing pressure successively causes said first valve to close said exhaust passage from said bleed passage and said second valve to connect said primary and secondary pressure chambers through said restricted bypass to expose said secondary pressure responsive surface to increased pressure in said secondary pressure chamber thereby opening said second valve with a snap action, and to connect said unloading valve passage to said primary pressure chamber thereby causing said unloading valve to open and to connect the bypass and exhaust conduits and whereby decreasing pressure successively causes said first valve to connect said exhaust passage to said unloading valve passage through said bleed passage and said second valve to isolate said unloading valve passage from the primary pressure chamber thereby causing said unloading valve to close.

4. In a pressure regulating device having an unloading valve assembly, including a spring loaded pressure responsive movable valve element for controlling flow from a bypass conduit to an exhaust conduit and means defining a cavity, the element having a pressure face exposed to pressure in the cavity, the improvement comprising, in combination: a regulating valve assembly having a primary pressure chamber, a fluid supply passage communicating with said primary pressure chamber, an unloading valve passage operatively connecting said primary pressure chamber with said cavity, an exhaust passage communicating with said exhaust conduit, a bleed passage operatively connecting said unloading valve passage and said exhaust passage, a first pressure responsive valve for controlling flow to said exhaust passage from said bleed passage, said first valve having a movable spool provided with a face subjected to pressure in the primary pressure chamber, a second pressure responsive valve for controlling flow to said unloading valve passage from said primary pressure chamber, said second valve having a secondary pressure chamber and a movable spool, said spool having a first face subjected to pressure in the primary pressure chamber and a second face subjected to pressure in the secondary pressure chamber, biasing means urging said spools toward said primary pressure chamber, said second valve having means including a restricted bypass for selectively connecting the primary and secondary pressure chambers upon relative movement of its spool, said first and second valves being responsive to pressure in said primary pressure chamber whereby increasing pressure successively causes said first valve to close said exhaust passage from said bleed passage and said second valve to connect said primary and secondary pressure chambers through said restricted bypass to expose the said second face of the spool of said second valve to pressure in said secondary chamber thereby opening said second valve with a snap action, and to connect said unloading valve passage to said primary pressure chamber thereby causing said unloading valve to open and to connect the bypass and exhaust conduits, and whereby decreasing pressure successively causes said first valve to connect said exhaust passage to said unloading valve passage through said bleed passage and said second valve to isolate said unloading valve passage from the primary pressure chamber thereby causing said unloading valve to close and to isolate the bypass conduit from the exhaust conduit.

5. In a fluid consuming system including a reservoir, a pump capable of delivering fluid from the reservoir to a pressure conduit through a pump output conduit, an unloading valve assembly including a spring loaded pressure responsive movable element, the element having a pressure face exposed to pressure in a cavity, the unloading valve assembly being connected to the pump output conduit by a bypass conduit and to the reservoir by an exhaust conduit whereby opening of the unloading valve connects the pump output conduit to the reservoir, the improvement comprising, in combination: a regulating valve assembly having a fluid supply passage connected to the pressure conduit, a primary pressure chamber communicating with the fluid supply passage, means including a first pressure responsive valve for selectively connecting the cavity to the exhaust conduit, means including a second pressure responsive valve for selectively connecting the cavity to the primary pressure chamber, each of said pressure responsive valves having a pressure surface exposed to pressure in said primary pressure chamber, means urging each said pressure surface toward said primary pressure chamber and yieldably responsive to different values of pressure in said primary pressure chamber acting on said first and second pressure responsive valves to permit relative movement of the said pressure surfaces, the pressure required to actuate the second valve being greater than that required to actuate the first valve whereby a predetermined maximum pressure causes the second valve to connect the said primary pressure chamber to the cavity to move the unloading valve element to open the unloading valve and a predetermined minimum pressure causes the first valve to connect the cavity to the exhaust conduit to permit the spring to return the unloading valve element to close the unloading valve.

6. In a fluid consuming system including a reservoir, a pump capable of delivering fluid from the reservoir to a pressure conduit through a pump output conduit, an unloading valve assembly including a spring loaded pressure responsive movable element, the element having a pressure face exposed to pressure in a cavity, the unloading valve assembly being connected to the pump output conduit by a bypass conduit and to the reservoir by an exhaust conduit whereby opening of the unloading valve connects the pump output conduit to the reservoir, the improvement comprising, in combination: a regulating valve assembly having a fluid supply passage connected to the pressure conduit, a primary pressure chamber communicating with the fluid supply passage, an unloading valve passage operatively connecting said primary pressure chamber with the cavity, an exhaust passage communicating with the exhaust conduit, a bleed passage operatively connecting said unloading valve passage and said exhaust passage, a first pressure responsive valve for controlling flow to the exhaust passage from said bleed passage, said first valve having a pressure adjustable spring loaded movable spool provided with a face subjected to pressure in the primary pressure chamber, a second pressure responsive valve for controlling flow to the unloading valve passage from said primary pressure chamber, said second valve having a secondary pressure chamber and a pressure adjustable spring loaded movable spool, said spool having a first face subjected to pressure in the primary pressure chamber and a second face subjected to pressure in the secondary pressure chamber; said second valve having means including a restricted bypass for selectively connecting the primary and secondary pressure chambers, said first and second valves being responsive to pressure in said primary pressure chamber whereby increasing pressure successively causes the first valve to close the exhaust passage from said bleed passage, the second valve to connect the primary and secondary pressure chambers through said restricted bypass to expose said second face to increased pressure in said secondary pressure chamber thereby opening said second valve with a snap action, and the second valve to connect the unloading valve passage to the primary pressure chamber, thereby causing the unloading valve to open and whereby decreasing pressure successively causes the first valve to connect the exhaust passage to the unloading valve passage through said bleed passage and the second valve to isolate the unloading valve passage from the primary pressure chamber thereby causing the unloading valve to close.

7. A regulating valve assembly comprising: a casing having an inlet conduit and a first and second outlet passage; a primary pressure chamber connected to said inlet conduit; means including a first pressure responsive valve for selectively connecting said first outlet passage to said second outlet passage; means including a second pressure responsive valve for selectively connecting said first outlet passage to said primary pressure chamber, each of said pressure responsive valves having a pressure surface exposed to pressure in said primary pressure chamber, means urging each said pressure surface toward said primary pressure chamber and yieldably responsive to different values of pressure in said primary pressure chamber acting on said first and second pressure responsive valves to permit relative movement of said pressure surfaces, the pressure responsive movement of said first valve closing said first outlet passage from said second outlet passage, the pressure responsive movement of said second valve connecting said first outlet passage to said primary pressure chamber; the pressure required to actuate the second valve being greater than that required to actuate the first valve.

8. A regulating valve assembly comprising: a casing having an inlet conduit and a first and second outlet passage; a primary pressure chamber connected to said inlet conduit; means including a first pressure responsive valve for selectively connecting said first outlet passage to said second outlet passage; means including a second pressure responsive valve for selectively connecting said first outlet passage to said primary pressure chamber; the first and second valves each having a movable spool provided with a face subjected to pressure in the primary pressure chamber; means urging each of said spools toward said primary pressure chamber and yieldably responsive to different values of pressure in said primary pressure chamber acting on said first and second pressure responsive valves to permit relative movement of said spools, the pressure responsive movement of said first valve closing said first outlet passage from said second outlet passage, the pressure responsive movement of said second valve connecting said first outlet passage to said primary pressure chamber; the pressure required to actuate the second valve being greater than that required to actuate the first valve; and means including a restricted bypass and responsive to initial movement of the second valve spool for shifting the same with a snap action to pressure position.

9. A regulating valve assembly comprising: a casing having an inlet conduit, a first and second outlet passage and a bleed passage operatively connecting said first and second outlet passages; a primary pressure chamber connected to said inlet conduit; a first pressure responsive valve for controlling flow to said second outlet passage from the said bleed passage; a second pressure responsive valve for controlling flow to said first outlet passage from the said primary pressure chamber; each of said pressure responsive valves having a primary pressure surface exposed to pressure in said primary pressure chamber, biasing means urging each of the said primary pressure surfaces toward said primary pressure chamber; said second valve having a secondary pressure chamber with a second pressure surface exposed to pressure in said secondary chamber; said second valve having means including a restricted bypass for selectively connecting the primary and secondary pressure chambers upon relative movement of its primary pressure surface; said first and second valves being responsive to pressure in said primary pressure chamber on said primary pressure surfaces whereby increasing pressure successively causes said first valve to close said second outlet passage from said bleed passage and said second valve to connect said primary and secondary pressure chambers through said restricted bypass to expose said secondary pressure responsive surface to increased pressure in said secondary pressure chamber thereby opening said second valve with a snap action to connect said first outlet passage to said primary pressure chamber and whereby decreasing pressure successively causes said first valve to connect said second outlet passage to said first outlet passage through said bleed passage and the said second valve to isolate said first outlet passage from the primary pressure chamber.

10. A regulating valve assembly comprising: a casing having an inlet conduit, a first and second outlet passage and a bleed passage operatively connecting said first and second outlet passages; a primary pressure chamber connected to said inlet conduit; a first pressure responsive valve for controlling flow to said second outlet passage from the said bleed passage, said first valve having a movable spool provided with a face subjected to pressure in the primary pressure chamber; a second pressure responsive valve for controlling flow to said first outlet passage from the said primary pressure chamber, said second valve having a secondary pressure chamber and a movable spool, said spool having a first face subjected to pressure in the primary pressure chamber and a second face subjected to pressure in the secondary pressure chamber; biasing means urging said spools toward said primary pressure chamber; said second valve having means including a restricted bypass for selectively connecting the primary and secondary pressure chambers upon relative movement of its spool; said first and second valves being responsive to pressure in said primary pressure chamber whereby increasing pressure successively causes said first valve to close said second outlet passage from said bleed passage and the said second valve to connect said primary and secondary pressure chambers upon relative movement of its spool to subject the second face of said secondary pressure chamber to increased pressure thereby opening said spool of said second valve with a snap action to connect said first outlet passage to said primary pressure chamber and whereby decreasing pressure successively causes said first valve to connect said second outlet passage to said first outlet passage through said bleed passage and second valve to isolate said first outlet passage from the primary pressure chamber.

11. A pressure regulating device comprising: a casing; a bypass conduit and an exhaust conduit connected to said casing; an unloading valve assembly including a cavity within said casing; means carried by said unloading valve assembly for controlling flow from the bypass conduit to the exhaust conduit; a regulating valve assembly adjacent said unloading valve assembly, said regulating valve assembly having a primary pressure chamber, means including a first pressure responsive valve for selectively connecting said cavity to said exhaust conduit, means including a second pressure responsive valve for selectively connecting the cavity to the primary pressure chamber, each of said pressure responsive valves having a pressure surface exposed to pressure in said primary pressure chamber, means urging each said pressure surface toward said primary pressure chamber and yieldably responsive to different values of pressure in said primary pressure chamber acting on said first and second pressure responsive valves to permit relative movement of said pressure surfaces, the pressure required to actuate the second valve being greater than that required to actuate the first valve.

12. A pressure regulating device comprising: a casing; a bypass conduit and an exhaust conduit connected to said casing; an unloading valve assembly including a cavity within said casing; a spring loaded pressure responsive movable valve element housed within said assembly for controlling flow from the bypass conduit to the exhaust conduit; said element having a pressure face exposed to pressure in said cavity; a regulating valve assembly adjacent said unloading valve assembly, said regulating valve assembly having a primary pressure chamber, means including a first pressure responsive valve for selectively connecting said cavity to said exhaust conduit, means including a second pressure responsive valve for selectively connecting the cavity to the primary pressure chamber, each of said pressure responsive valves having a pressure surface exposed to pressure in said primary pressure chamber, means urging each said pressure surface toward said primary pressure chamber and yieldably responsive to different values of pressure in said primary pressure chamber acting on said first and second pressure responsive valves to permit relative movement of the said pressure surfaces, the pressure required to actuate the second valve being greater than that required to actuate the first valve.

13. A pressure regulating device comprising: a casing; a bypass conduit and an exhaust conduit connected to said casing; an unloading valve assembly including a cavity within said casing; a spring loaded pressure responsive movable valve element housed within said assembly for controlling flow from the bypass conduit to the exhaust conduit; said element having a pressure face exposed to pressure in said cavity; a regulating valve assembly adjacent said unloading valve assembly, said regulating valve assembly having a fluid supply passage and a primary pressure chamber communicating with said fluid supply passage, means including a first pressure responsive valve for selectively connecting said cavity to said exhaust conduit, means including a second pressure responsive valve for selectively connecting the cavity to the primary pressure chamber, the first and second valves each having a movable spool provided with a face subjected to pressure in the primary pressure chamber, means urging each of said spools toward said primary pressure chamber and yieldably responsive to different values of pressure in said primary pressure chamber acting on said first and second pressure responsive valves to permit relative movement of said spools, the pressure required to actuate the second valve being greater than that required to actuate the first valve, said second pressure responsive valve having means including a restricted bypass communicating with said primary pressure chamber and responsive to initial movement of the second valve spool for shifting the same with a snap action to pressure position.

14. A pressure regulating device comprising: a casing; a bypass conduit and an exhaust conduit connected to said casing; an unloading valve assembly including a cavity within said casing; a spring loaded pressure responsive movable valve element housed within said assembly for controlling flow from the bypass conduit to the exhaust conduit; said element having a pressure face exposed to pressure in said cavity; a regulating valve assembly adjacent said unloading valve assembly, said regulating valve assembly having a primary pressure chamber, an unloading valve passage operatively connecting said primary pressure chamber with said cavity, an exhaust passage communicating with said exhaust conduit, a bleed passage operatively connecting said unloading valve passage and said exhaust passage, a first pressure responsive valve for controlling flow to said exhaust passage from said bleed passage, a second pressure responsive valve for controlling flow to said unloading valve passage from the said primary pressure chamber, each of said pressure responsive valves having a primary pressure surface exposed to pressure in said primary pressure chamber, biasing means urging each of the said primary pressure surfaces toward said primary pressure chamber, said second valve having a secondary pressure chamber with a secondary pressure surface exposed to pressure in said secondary pressure chamber, said second valve having means including a restricted bypass for selectively connecting the primary and secondary pressure chambers, said first and second valves being responsive to pressure in said primary pressure chamber whereby increasing pressure successively causes said first valve to close said exhaust passage from said bleed passage and said second valve to connect said primary and secondary pressure chambers through said restricted bypass to expose said secondary pressure responsive surface to increased pressure in said secondary pressure chamber thereby opening said second valve with a snap action, and to connect said unloading valve passage to said primary pressure chamber thereby causing said unloading valve to open and to connect the bypass and exhaust conduits and whereby decreasing pressure successively causes said first valve to connect said exhaust passage to said unloading valve passage through said bleed passage and said second valve to isolate said unloading valve passage from the primary pressure chamber thereby causing said unloading valve to close.

15. A pressure regulating device comprising: a casing; a bypass conduit and an exhaust conduit connected to said casing; an unloading valve assembly including a cavity within said casing; a spring loaded pressure responsive movable valve element housed within said assembly for controlling flow from the bypass conduit to the exhaust conduit; said element having a pressure face exposed to pressure in said cavity; a regulating valve assembly adjacent said unloading valve assembly, said regulating valve assembly having a primary pressure chamber, a control passage communicating with said primary pressure chamber, an unloading valve passage operatively connecting said primary pressure chamber with said cavity, an exhaust passage communicating with said exhaust conduit, a bleed passage operatively connecting said unloading valve passage and said exhaust passage, a first pressure responsive valve for controlling flow to said exhaust passage from said bleed passage, said first valve having a movable spool provided with a face subjected to pressure in the primary pressure chamber, a second pressure responsive valve for controlling flow to said unloading valve passage from said primary pressure chamber, said second valve having a secondary pressure chamber and a movable spool, said spool having a first face subjected to pressure in the primary pressure chamber and a second face subjected to pressure in the secondary pressure chamber, biasing means urging said spools toward said primary pressure chamber, said second pressure responsive valve having means including a restricted bypass for selectively connecting the primary and secondary pressure chambers upon relative movement of the spool, said first valve and said second valve being exposed to pressure in said primary pressure chamber whereby increasing pressure successively causes said first valve to close said exhaust passage from said bleed passage and said second valve to connect said primary and secondary pressure chambers through said restricted bypass to expose said second face to increased pressure in said secondary chamber thereby opening said second valve with a snap action, and to connect said unloading valve passage to said primary pressure chamber thereby causing said unloading valve to open and to connect the bypass and exhaust conduits, and whereby decreasing pressure successively causes said first valve to connect said exhaust passage to said unloading valve passage through said bleed passage and said second valve to isolate said unloading valve passage from the primary pressure chamber thereby causing said unloading valve to close and to isolate the bypass conduit from the exhaust conduit.

References Cited in the file of this patent

UNITED STATES PATENTS

| | | |
|---|---|---|
| 1,293,178 | Osborne | Feb. 4, 1919 |
| 2,393,571 | Schultz | Jan. 22, 1946 |
| 2,650,605 | Mackie | Sept. 1, 1953 |
| 2,737,966 | Lucien | Mar. 13, 1956 |
| 2,905,432 | Mercier | Sept. 22, 1959 |